United States Patent [19]

Komiyama et al.

[11] 3,992,230

[45] Nov. 16, 1976

[54] METHOD FOR SURFACE TREATMENT OF ELECTRODE IN DISTRIBUTOR OF INTERNAL COMBUSTION ENGINE FOR SUPPRESSING NOISE

[75] Inventors: Yoshiro Komiyama, Okazaki; Katsumi Kondo, Toyota; Yoichiro Asano, Toyota; Mituo Ando, Toyota, all of Japan

[73] Assignee: Toyota Jidosha Kogyo Kabushiki Kaisha, Japan

[22] Filed: June 18, 1975

[21] Appl. No.: 588,051

[30] Foreign Application Priority Data

| | | |
|---|---|---|
| June 26, 1974 | Japan | 49-72274 |
| Feb. 3, 1975 | Japan | 50-13472 |

[52] U.S. Cl. .......... 148/6.3; 148/6.31; 148/6.35; 427/34; 427/58; 427/123; 427/126

[51] Int. Cl.$^{2}$ .......... B05D 5/12; C23C 11/08; F02P 7/02; H04B 15/02

[58] Field of Search .......... 427/34, 405, 419, 58, 427/101, 103, 123, 126, 372, 402, 423; 148/6.31

[56] References Cited

UNITED STATES PATENTS

| | | | |
|---|---|---|---|
| 2,464,533 | 3/1949 | Shearer | 338/99 |
| 3,209,298 | 9/1965 | Evanicsko et al. | 200/267 X |
| 3,609,257 | 9/1971 | Jinsenji | 200/11 |

*Primary Examiner*—James R. Hoffman
*Attorney, Agent, or Firm*—Stevens, Davis, Miller & Mosher

[57] ABSTRACT

Using a plasma arc coating process or a thermospraying process or a detonation process an electrode of a rotor of a distributor for the ignition system of an internal combustion engine was surface treated to provide the electrode with a surface layer of an electrically high resistive material, e.g. CuO. A distributor having the treated rotor included therein exhibited significantly suppressed noise. Instead of or in addition to the rotor, each of the stationary terminals of the distributor may be so treated.

16 Claims, 14 Drawing Figures

Fig. 1
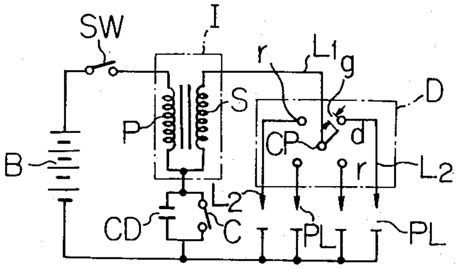
Fig. 2-a
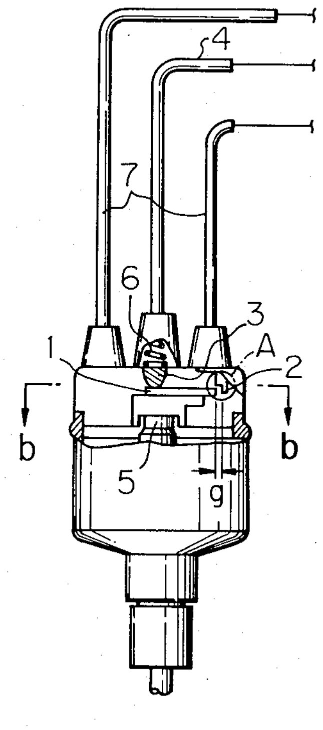
Fig. 2-b
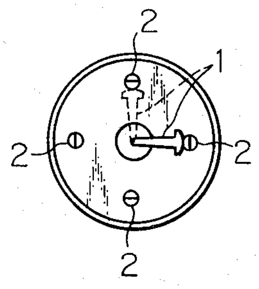

Fig. 3-a
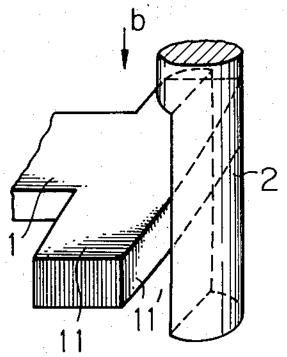
Fig. 3-b
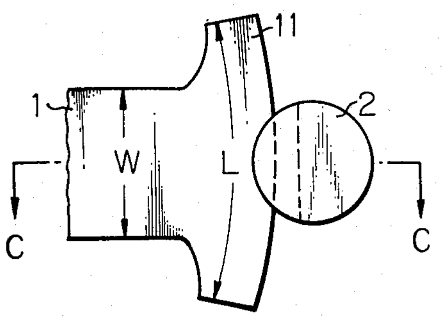
Fig. 3-c
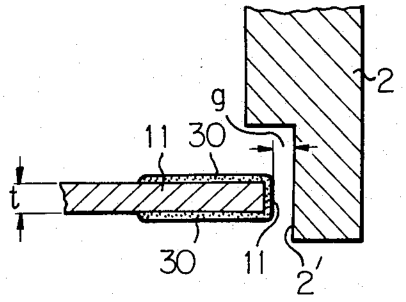
Fig. 4-c
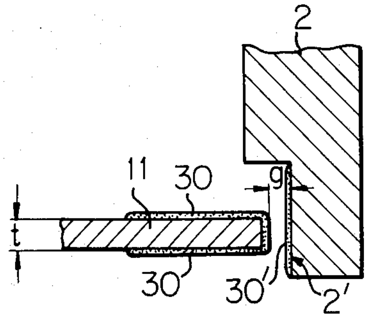

METHOD FOR SURFACE TREATMENT OF ELECTRODE IN DISTRIBUTOR OF INTERNAL COMBUSTION ENGINE FOR SUPPRESSING NOISE

The invention relates to methods for surface treatment of at least one electrode of both the distributor rotor and the stationary terminals in a distributor of an internal combustion engine for noise suppression. More particulary, it relates to methods for forming a layer of an electrically high resistive material onto a surface of at least one electrode of both the distributor rotor and the stationary terminals in a distributor of an internal combustion engine. The invention also relates to an improved distributor suitable for use in the ignition system of an internal combustion engine, which distributor emits significantly suppressed or reduced noise during the operation of the engine including said distributor.

The igniter in which an electric current has to be intermitted quickly in order to generate a spark discharge, radiates the noise which accompanies the occurrence of the spark discharge. It is well known that the noise distrubs radio broadcasting service, television broadcasting service and other kinds of radio communication systems and, as a result, the noise deteriorates the signal-to-noise ratio of each of the above-mentioned services and systems. Further, it should be recognized that the noise also causes operational errors in electronic control circuits which will undoubtedly be more widely and commonly utilized in the near future as vehicle control systems, for example E.F.I. (electronic controlled fuel injection system), E.S.C. (electronic controlled skid control system) or E.A.T. (electronic controlled automatic transmission system), as a result, traffic safety will be threatened. In addition, the tendency for an electric current flowing in the igniter to become very strong and to be intermitted very quickly to generate a strong spark discharge, will become a common occurrence because of the increasing emphasis on clean exhaust gas. However, strong spark discharge is accompanied by extremely strong noise which aggravates the previously mentioned disturbance and operational errors.

For the purpose of suppressing noise, various kinds of apparatuses or devices have been proposed. However, most of the proposed apparatuses or devices are too expensive for practical use in mass-produced vehicles. Further, these apparatuses or devices are not, in practice, reliable. In the prior art, there are three kinds of typical apparatuses for suppressing noise. A first typical one is the resistor which is S, L or K shaped and is attached to the external terminal of the spark plug, or in some cases, the resistor is contained in the spark plug and hence, is called a resistive spark plug. A second typical one is also a resistor which is inserted in one portion of the high tension cable and hence, is called a resistive high tension cable. A third typical one is the noise suppressing capacitor. However, the above-mentioned prior art apparatuses for suppressing noise, are defective in that although they can suppress noise to a certain intensity level, that level is over the noise level which must be suppressed in the fields of the above-mentioned broadcasting services, radio communication systems and electronic controlled vehicle control systems. Moreover, the noise suppressing capacitor has no effect on high-frequency noises.

In the copending application Ser. No. 566,935 filed on Apr. 10, 1975, there is disclosed and claimed an improved distributor with suppressed noise emission, wherein either or both of the electrode of the rotor and the electrode of each stationary terminal have a surface layer of an electrically high resistive material.

It is the principal object of the present invention to provide a method for surface treatment of the electrode in the distributor of the internal combustion engine for the purpose of suppressing noise, and more specifically, to provide a method for forming the electrically high resistive material layer on the surface of the electrode.

In accordance with one aspect of the invention there is provided a method for surface treatment of at least one electrode of both the distributor motor and stationary terminals in a distributor of an internal combustion engine for noise suppression, wherein a finely divided electrically high resistive material is applied onto a surface of said electrode by a plasma arc coating process or a thermo-spraying process or a detonation process to form a surface layer of the electrically high resistive material on said surface.

The term "detonation process" as used herein refers to any technique for spraying high melting materials, such as metal or metal oxide, wherein the material in the form of powder is sprayed by the action of a detonating explosive. By the expressions "thermo-spraying process" and "plasma arc coating process" as referred to herein is meant any technique for spraying high melting materials, such as mentioned above, wherein the material in the form of powder is heated in an oxy-acetylene flame or in a plasma arc, and then cause to be propelled from the flame or arc in the form of molten or semi-molten particles. These techniques per se are not the subject matter of the invention and general procedures therefore are described in literatures, including, for example, SAE No. 690,481, Automation July (1970) pp 76–79, and Materials Engineering 1–73, pp 46–48.

We prefer to use finely divided particles of a size of −48=350 mesh of a material having an electrical resistance of about $10^{-3}$ to $10^{9}$ Ω cm, preferably $10^{-1}$ to $10^{5}$ Ω cm, such as $CuO$, $NiO$, $Cr_2O_3$, Si or $VO_2$. Other materials having higher electrical resistances of about $10^{13}$ to $10^{15}$ Ω cm, such as alumina, may also be used. However, with such materials having higher electrical resistances, the performance of the distributor tends to become unstable. The coating or spraying process may be usually continued until the surface layer so formed reaches a thickness of about 0.1 to 0.6 mm. If desired, the adhesive of the surface layer to the electrode may be enhanced by providing an intermediate layer of a suitable material. We have found that where the electrode is made of steel or brass and the surface layer is composed of CuO, or NiO, an intermediate layer of nickel aluminide is particularly suitable for this purpose. The nickel aluminide may have such a composition that it comprises 80 to 97% weight of Ni and 20 to 3% by weight of A1. The most preferable nickel aluminide essentially consists of about 95.5% by weight of Ni and about 4.5% by weight of A1. The intermediate layer of nickel aluminide may be applied spraying finely divided nickel aluminide onto the surface of the electrode using a plasma arc coating process or a thermo-spraying process. On the layer of nickel aluminide the above-mentioned layer of an electrically high resistive material may be formed in a manner as described herein.

In accordance with another aspect of the invention, there is provided a method for surface treatment of at least one electrode of both the distributor rotor and stationary terminals in a distributor of an internal combustion engine for noise suppression, wherein a finely divided material, at least the surface of which is capable of processing a high electrical resistance when it is oxidized, is applied onto the surface of said electrode by a plasma arc coating process or a thermo-spraying process to form a surface layer on said electrode. The surface layer so formed is then oxidized.

Examples of the usable material include, particulate metals, such as particles of copper, Fe—36% Ni alloy, aluminum, nickel and silicon. When these particles are oxidized, at least the surface layers of the particles are converted to the corresponding oxides having a high electrical resistance. The finely divided particulate material may be applied onto the surface of the electrode, which may have an intermediate layer of nickel aluminide formed thereon in a manner as described above, by a plasma arc coating process or a thermo-spraying process. The metallic layer so formed is then oxidized, for example, by baking it in an air furnace at a temperature of about 300° to 900° C for a period of about 1 to 10 hours, whereby the surface layer of an electrically high resistive material may result.

Alternatively, the finely divided metallic material, as exemplified above, may first be oxidized, for example, by baking it in an air furnace at a temperature of about 300° to 900° C for a period of about 1 to 10 hours, to particles at least the surface layers of which have a high electrical resistance, and then the oxidized material may be applied onto the surface of the electrode, which may have an intermediate layer of nickel aluminide formed thereon in a manner as described above, by a plasma arc coating process or a thermo-spraying process.

In the first and last mentioned methods wherein a finely divided material having a high electrical resistance is applied onto the surface of the electrode by a plasma arc process or a thermo-spraying process, the surface layer so formed of an electrically high resistive material may be post-treated by baking it in an air furnace at a temperature of 300° to 800° C.

In accordance with a special aspect of the invention, there is provided a distributor for the ignition system of an internal combustion engine with suppressed noise emission, which comprises a rotor and a plurality of stationary terminals operably arranged around and in close proximity to a circular locus defined by the rotation of said rotor, said rotor, when it rotates, being capable of successively forming a suitable gap for spark discharge between its electrode and an electrode of each of said stationary terminals, characterized in that either or both of said electrode of the rotor and said electrode of each terminal comprise a substrate made of brass or steel, an intermediate layer made of nickel aluminide comprising to 80 to 97% by weight of Ni and 20 to 3% by weight of A1, and an electrically high resistive layer primarily composed of CuO or NiO. The electrically high resistive layer should preferably have a thickness of 0.1 to 0.6 mm and an electrical resistance of $10^{-3}$ to $10^{9}$ Ω cm, preferably $10^{-1}$ to $10^{5}$ Ω cm.

The present invention will be more appparent from the ensuing description with reference to the accompanying drawings wherein:

FIG. 1 is a typical conventional wiring circuit diagram of an igniter;

FIG. 2-*a* is a side view, partially cut off, showing a typical distributor utilized in the present invention;

FIG. 2-*b* is a sectional view taken along the line *b—b* of FIG. 2-*a;*

FIG. 3-*a* is a perspective view of electrodes for spark discharge utilized in the present invention;

FIG. 3-*b* is a plan view seen from the arrow *b* of FIG. 3-*a;*

FIG. 3-*c* is a sectional view taken along the line *c—c* of FIG. 3-*b;*

FIG. 4-*c* is a sectional view taken along the line *c—c* of FIG. 3-*b* in accordance with a modified embodiment of the electrodes for spark discharge;

Figure 11:
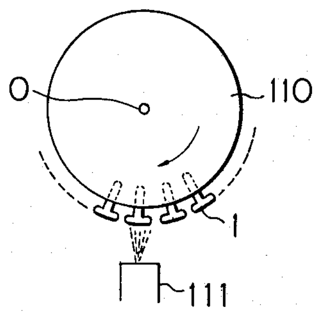
Figure 12:
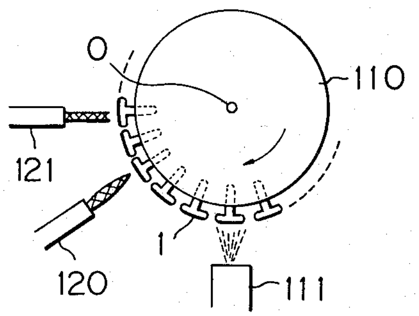

FIG. 11 diagrammatically illustrates an apparatus for carrying out one form of the methods of the invention; and FIG. 12 illustrates a modification of the apparatus shown in FIG. 11.

FIG. 1 is a typical conventional wiring circuit diagram of the igniter, the construction of which depends on the well known battery-type ignition system. In FIG. 1, a DC current which is supplied from the positive terminal of a battery B flows through an ignition switch SW, a primary P of an ignition coil I and a contact point C which has a parallelly connected capacitor CD, to the negative terminal of the battery B. When the distributor cam (not shown) rotates in synchronization with the rotation of the crank-shaft located in the internal combustion engine, the distributor cam cyclically opens and closes the contact point C. When the contact point C opens quickly, the primary current suddenly stops flowing through the primary winding P. At this moment, a high voltage is electromagnetically induced through a secondary winding S of the ignition coil I. The induced high-voltage surge, which is normally 10 – 30 (KV) leaves the secondary coils S and travels through a primary high tension cable $L_1$ to a center piece CP which is located in the center of the distributor D. The center piece CP is electrically connected to the distibutor rotor *d* which rotates within the rotational period synchronized with said crank-shaft. Four stationary terminals r, assuming that the engine has four cylinders, in the distributor D are arranged with the same pitch along a circular locus which is defined by the rotating electrode of the rotor *d*, maintaining a small gap *g* between the electrode and the circular locus. The induced high-voltage surge is further fed to the stationary terminals *r* through said small gap *g* each time the electrode of the rotor *d* comes close to one of the four stationary terminals *r*. Then, the induced high-voltage surge leaves one of the terminals *r* and further travels through a secondary high tension cable $L_2$ to a corresponding spark plug PL, where a spark discharge occurs in the corresponding spark plug PL and ignites the fuel air mixture in the corresponding cylinder.

It is a well known phenomenon that noise is radiated with the occurrence of a spark discharge. As can be seen in FIG. 1, three kinds of spark discharge occur at three portions in the igniter, respectively. A first spark discharge occurs at the contact point C of the contact breaker. A second spark discharge occurs at the small gap *g* between the electrode of the rotor *d* and the electrode of the terminal *r*. And a third spark discharge occurs at the spark plug PL. In various kinds of experiments, the inventors discovered that, among the three kinds of spark discharges, although the first and third spark discharges can ordinarily be suppressed by the capacitor and resistive spark plug respectively, the second spark discharge, which occurs at the small gap *g* between the electrode of the rotor *d* and the electrode of the terminal *r*, still radiates the strongest noise compared with the other two. This is because the second spark discharge includes a spark discharge, the pulse width of which is extremely small and the discharge current of which is extremely large. This spark discharge radiates the strongest noise from the high tension cables $L_1$ and $L_2$, which act as antennae.

Although the reason for the production of a spark discharge having an extremely small pulse width and an extremely large discharge current has already been explained in detail in Japanese patent application No. 49-003467 (corresponding to U.S. Pat. application No. 470,974 filed on May 17, 1974, now Pat. No. 3,949,721).

A brief summary of said reason will be offered here. In FIG. 1, the high voltage of the induced high voltage surge from the secondary winding S appears at the rotor *d* not as a step-like wave, but as a wave in which a voltage at the rotor *d* increases and reaches said high voltage gradually with a time constant the value of which is mainly decided by the circuit constant of the ignition coil I and the primary high tension cable $L_1$. When the voltage which appears at the rotor d increases and reaches a sufficient voltage, it causes a spark discharge at the gap *g* between the electrodes of the rotor *d* and the terminal *r*, and, at the same time, the electric charge which has been charged to a distributed capacity along the primary high tension cable $L_1$, moves to a distributed capacity along the secondary high tension cable $L_2$ through the present spark discharge, which is generally called a capacity discharge. A voltage level along the primary high tension cable $L_1$ momentarily decreases when the capacity discharge occurs. However, immediately after said capacity discharge occurs, a voltage at the spark plug PL gradually increases with a certain time constant, and when said voltage reaches an adequate level, the spark discharge occurs at the spark plug PL. This spark discharge is generally called an inductive discharge. Thereby, one ignition process is completed. Thus, a spark discharge current which flows through the small gap *g*, is produced in accordance with the capacitive discharge and the inductive discharge, respectively. Above all the strongest noise accompanied by deleterious high frequencies has been found in connection with the capacity discharge which includes a great deal of discharge pulses having an extremely small pulse width and an extremely large discharge current. Therefore, the principles of the present invention are to transform said wave of the capacity discharge current into a wave with a relatively large pulse width and a relatively small discharge current. Therefore, the deleterious high frequency components are considerably lessened because of the stabilized capacity discharge current of the latter by the above-mentioned transformation of the wave. The construction of the electrodes including the electrically high resistive material layer which realizes the transformation of the wave of the capacity discharge current, will now be explained.

In FIGS. 2-*a* and 2-*b*, 1 indicates a distributor rotor (corresonding to d in FIG. 1), and 2 indicates a stationary terminal (corresponding to *r* in FIG. 1). The electrode of rotor 1 and the electrode of terminal 2 face each other with said small gap *g* (FIG. 2-*a*) between them.

A center piece 3 (corresponding to CP in FIG. 1) touches the inside end portion of the rotor 1. The induced high voltage surge at the secondary winding S (FIG. 1) travels through a primary high tension cable 4 (corresponding to $L_1$ in FIG. 1) and through the center piece 3 to the electrode of the rotor 1. A spring 6 pushes the center piece 3 downward to the rotor 1, thereby making a tight electrical connection between them. At the same time when the electrode of the rotor 1, which is indicated by the solid line in FIG. 3-*b*, faces the terminals 2, the high voltage surge is fed to the terminal 2 through a spark discharge and is applied to the corresponding spark plug PL (FIG. 1) through a secondary high tension cable 7 (corresponding to $L_2$ in FIG. 1), where the fuel air mixture is ignited in the corresponding cylinder. When the rotor 1 rotates to the position indicated by the dotted line in FIG. 3-*b*, and the electrode of the rotor 1 faces the next terminal 2, the high voltage surge is fed to the next terminal 2 through a spark discharge and is applied to the next corresponding spark plug PL (FIG. 1) through the other secondary high tension cable 7. In a similar way, the high voltage surge is sequentially distributed.

FIGS. 3-*a*, 3-*b* and 3-*c* shown enlarged views of electrodes of the distributor rotor and the stationary terminal used in the present invention, which correspond to the members contained in circle A which is indicated by the chain dotted line in FIG. 2-*a*. In FIG. 3-*a* 11 indicates the electrode which is formed as a part of rotor 1 as one body and is T-shaped. A front surface 11' of the electrode 11 faces a side surface 2' (FIG. 3-*c*) of the terminal 2 with a spark discharging gap g. Both the front surface 11' and the side surface 2' act as electrodes for spark discharge. The width of the rotor 1 (indicated by W in FIG. 3-*b*) is about 5 (mm), and the length of the electrode 11 (indicated by L in FIG. 3-*b*) and the thickness of the electrode 11 (indicated by *t* in FIG. 3-*c*) are, respectively, about 10 (mm) and 1.0 (mm). The reference numeral 30 (FIG. 3-*c*) indicates the electrically high resistive material layer which is formed on the electrode by the method according to the present invention described in detail later. It should be noted that an electrically high resistive material layer can also be formed on the electrode 2' as shown by the numeral 30' in FIG. 4-*c*.

Accordingly, it is also possible to form electrically high resistive material layers on the electrode 11 and/or the electrode 2'.

Figure 5:
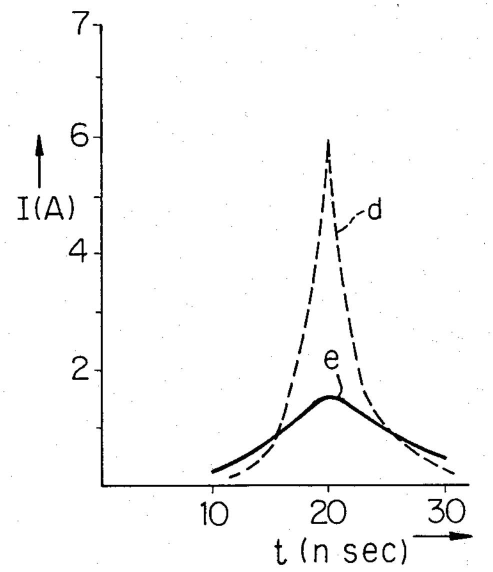
FIG. 5 is a graph showing changes of the current flow (in A), which is the so-called capacity discharge current in the igniter with an electrically high resistive material layer and an igniter without said layer with respect to time (in ns)

FIG. 5 is a graph clarifying the effect of the electrically high resistive material layer on reducing the capacity discharge current. In FIG. 5 the wave form indicated by the solid line *e* and the one indicated by the dotted line *d* show the changes of the capacity discharge current when using and when not using the electrically high resistive material layer, respectively. In FIG. 5, the coordinates indicate a capacity discharge current I in A, and time in ns. It should be apparent from FIG. 5 that the maximum capacity discharge current I is remarkably reduced and at the same time, both the pulse width and the rise time of the capacity discharge current are expanded by forming the electrically high resistive material layer on the electrodes 11 and/or 2'. A capacity discharge current which includes deleterious high frequency components and thus radiates strong noise, can be transformed into a capacity discharge current which has almost no deleterious high frequency components, and only slight noise, by applying said electrically high resistive material layer to the electrode.

The reason the above-mentioned transformation of the capacity discharge current wave form can be accomplished is not known, but it is possible that a normal discharge at the spark discharging gap g between the electrodes 11 and 2' does not occur because of the intervention of the electrically high resistive material layer 30 (30') which lies therebetween, thus interrupting the flow of the discharge current.

As mentioned above, both the rise time and the pulse width of the capacity discharge current are expanded by providing only the electrically high resistive material layer between the spark discharging gap *g*, whereby the deleterious high frequency components and the accompanying strong noise can be both eliminated from the capacity discharge current.

The following examples of the present invention show various kinds of methods which can be used to form the electrically high resistive material layer on the electrode.

It should be noted that each of the following examples by which said electrically high resistive material layer is formed on the surface of the electrode 11, is basically classified into one of three methods which are: firstly, applying finely divided particles having high electric resistance onto the surface of the electrode; secondly, applying onto the surface of the electrode finely divided particles the surface layers of which are capable of possessing high electric resistance when the surface layers are oxidized, and then, oxidizing the finely divided particles so applied onto said surface of the electrode; and thirdly oxidizing finely divided particles the surface layers of which are capable of possessing high electric resistance when the surface layers are oxidized, and applying said finely divided particles so oxidized onto the surface of the electrode. In each of the following examples, the electrically high resistive material layer is formed on only the surface of the electrode 11 in order to simplify the explanation.

EXAMPLE 1

Figure 6:
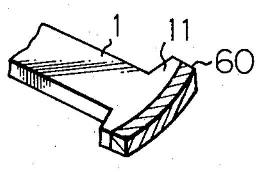
FIG. 6 is a perspective view of an electrode of the distributor rotor and shows the entire tip area on which an electrically high resistive material layer has been formed.

An electrode 11 made of brass (as shown in FIGS. 3-*a*, 3-*b* and 3-*c*) was washed with, Triclene, duPont's trademarked trichloroethylene and the area of the electrode (the hatches area 60 as shown in FIG. 6) to which a layer of electrically high resistive material was to be applied, was uniformly made coarse by a blasting technique. Using a METCO 3 MBT plasma gun (a trade name), a copper coating of 0.1 to 0.25 (mm) in thickness was applied to said area 60 by a plasma arc coating technique wherein finely divided copper of a size of −250 +350 mesh was sprayed onto said area 60 and was subjected to a plasma arc of an appropriate current, preferably 400 (amp.), while air cooling the surface of the electrode 11 at a temperature of not higher than 150° C. The electrode so-coated with copper was baked in a furnace at a temperature of 600° C for 2 hours and allowed to slowly cool whereby the copper layer was oxidized and an electrically high resistive material layer was obtained.

The distributor, in accordance with this example, was included in a conventional vehicle and was tested for the noise-field intensity level. The observed frequency of noise was within the range of from 50 to 300 (MHz). The observed level was 15 to 20 dB below the permitted value (ECE Reg 10). Further, the peak of the capacity discharge current (as designed by *e* in FIG. 5) of the distributor was revealed to be as low as 1.88 amp.

EXAMPLE 2

An electrode 11 made of brass (as shown in FIGS. 3-*a*, 3-*b* and 3-*c*) was washed with triclene, and the area of the electrode (the hatched area 60 as shown in FIG. 6) to which layer of electrically high resistive material was to be applied, was uniformly made coarse by a blasting technique. Using a METCO 3 MBT gun (a trade name), an aluminum coating of 0.15 to 0.20 (mm) in thickness was applied to said area 60 by a plasma arc coating technique wherein finely divided aluminum of a size of −100 +250 mesh was sprayed onto said area 60 and was subjected to a plasma arc of an appropriate current, preferably 400 (amp.), while cooling the surface of the electrode 11 with air. The electrode so coated with aluminum was baked in a furnace at a temperature of 600° C for 2 hours and allowed to slowly cool whereby the aluminum layer was oxidized to a layer of electrically high resistive material.

The distributor, in accordance with this example, was included in a conventional vehicle and was tested for the noise-field intensity level in which the observed frequency of noise was within the range of from 50 to 300 (MHz). The observed level was 10 to 15 dB below the permitted value. Further, the peak of the capacity discharge current of the distributor was revealed to be as low as 1.67 amp.

EXAMPLE 3

An electrode 11 made of brass (as shown in FIGS. 3-*a*, 3-*b* and 3-*c*) was washed with triclene, and the area of the electrode (the hatched area 60 as shown in FIG. 6) to which a layer of electrically high resistive material was to be applied, was uniformly made coarse by a blasting technique. An aluminum oxide coating of 0.1 to 0.20 mm in thickness was applied to said area 60 by a plasma arc coating technique.

The distributor, in accordance with this example, was included in a conventional vehicle and was tested for the noise-field intensity level. Results similar to those as in Example 1 were obtained.

The above procedure was repeated except that the aluminum oxide was applied on the electrode by a thermo-spraying technique. Similar results were obtained.

EXAMPLE 4

An electrode 11 made of brass (as shown in FIGS. 3-*a*, 3-*b* and 3-*c*) was washed with triclene, and the area of the electrode (the hatched area 60 as shown in FIG. 6) to which a layer of electrically high resistive material was to be applied, was uniformly made coarse by a blasting technique. Using a mixture of 50% by weight of finely divided aluminum oxide and 50% by weight of finely divided aluminum, an electrically high resistive layer 30 of 0.25 (mm) in thickness was applied to the area 60 by a plasma arc coating technique.

The distributor, in accordance with this example, was included in a conventional vehicle and was tested for the noise-field intensity level in which an observed frequency of noise was within a range from 50 to 300 (MHz). The level observed was 10 to 15 dB below the permitted value.

EXAMPLE 5

An electrode 11 made of brass (as shown in FIGS. 3-*a*, 3-*b* and 3-*c*) was washed with triclene, and the area of the electrode (the hatched area 60 as shown in FIG. 6) to which a layer of electrically high resistive material was to be applied was uniformly made coarse by a blasting technique. Finely divided silicon of a size of −48 +100 mesh was applied onto said area 60 by a flame spraying technique, the so-called thermo-spray technique, using an oxygen-acetylene flame to form a coating of 0.15 to 0.20 (mm) in thickness.

The electrode so coated was baked in a furnace at an appropriate temperature and for an appropriate duration, preferably at 600° C and for 2 hours, and allowed to slowly cool whereby the silicon layer was oxidized and an electrically high resistive material layer was obtained.

The distributor, in accordance with this example, was included in a conventional vehicle and was tested for the noise-field intensity level in which the observed frequency of noise was within the range of from 50 to 300 (MHz). The level observed was 20 to 25 dB below the permitted value. Further, the peak of the capacity discharge current of the distributor was revealed to be as low as 1.0 amp.

EXAMPLE 6

Finely divided electrolytic copper of a size of −150 +350 mesh having an apparent density of 1.8 to 2.2 was oxidized to CuO by exposure to a hot air atmosphere in a furnace at a temperature of 600° C for 2 hours. The so obtained CuO was milled by vibration and screened to obtain a fraction of −100 +350 mesh.

An electrode 11 made of brass (as shown in FIGS. 3-*a*, 3-*b* and 3-*c*) was washed with triclene, and the area of the electrode (the hatched area 60 as shown in FIG. 6) to which a layer of electrically high resistive material was to be applied, was uniformly made coarse by a blasting technique. Onto said area 60, nickel aluminide (METCO No. 450) essentially consisting of 95.5% by weight of Ni and 4.5% by weight of A1 was applied by a plasma arc coating technique to form a coating of 0.05 to 0.10 (mm) in thickness. The purpose of this coating is to enhance the adhesive of the electrically high resistive layer 30 to the electrode 11. Using a METCO 3 MBT gun (a trade name), a copper oxide coating of 0.1 to 0.15 (mm) in thickness was then applied to said area 60 by a plasma arc coating technique wherein the finely divided copper oxide was sprayed onto said area 60 and subjected to a plasma arc of 400 (amp) while cooling the surface of the electrode 11 with Air.

The distributor, in accordance with this example, was included in a conventional vehicle and was tested for the noise-field intensity level in which the observed frequency of noise was within the range of from 50 to 300 (MHz). The observed level was about 20 dB below the permitted value (ECE Reg 10). Further, the peak of the capacity discharge current of the distributor was revealed to be as low as 1.60 amp.

EXAMPLE 7

An electrode 11 made of brass (as shown in FIGS. 3-*a*, 3-*b* and 3-*C*) was washed with triclene, and the area of the electrode (the hatched area 60 as shown in FIG. 6) to which a layer of electrically high resistive material was to be applied, was uniformly made coarse by a blasting technique. Onto said area, 60 particulate nickel aluminide (METCO No. 450) essentially consisting of 95.5% by weight of Ni and 4.5% by weight of A1 was applied by a plasma arc coating technique to form a coating of 0.05 to 0.10 (mm) in thickness. On the layer of nickel aluminide, finely divided copper of a size of −150 mesh was applied by a plasma arc coating technique to form a coating of 0.2 to 0.3 (mm) in thickness.

The electrode so coated was baked in a furnace at an appropriate temperature and for an appropriate duration, preferably at 600° C for 2 hours, and allowed to slowly cool whereby the copper layer was oxidized to a layer of electrically high resistive material.

The distributor, in accordance with this example, was included in a conventional vehicle and was tested for the noise-field intensity level in which the observed frequency of noise was within the range of from 50 to 300 (MHz). The observed level was 15 to 20 dB below the permitted value. Further, the peak of the capacity discharge current of the distributor was revealed to be as low as 1.2 to 1.5 amp.

EXAMPLE 8

Figure 7:
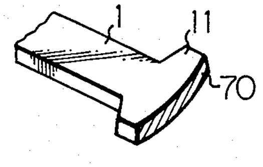
FIG. 7 is a perspective view of an electrode of the distributor rotor and shows one surface area on which an electrically high resistive material layer has been formed.

An electrode 11 made of brass (as shown in FIGS. 3-*a*, 3-*b* and 3-*c*) was washed with triclene, and the area of the electrode (the hatched area 70 as shown in FIG. 7) to which a layer of electrically high resistive material was to be applied was uniformly made coarse by a blasting technique. Onto said area 70, particulate nickel aluminide (METCO No. 450) essentially consisting of 95.5% by weight of Ni and 4.5% by weight of A1 was coated by a plasma arc coating technique to form a coating of 0.05 to 0.10 (mm) in thickness. Finely divided electrolytic copper of a size of −150 +350 mesh having an apparent density of 1.8 to 2.0 was oxidized to cupric oxide by exposure to a hot air atmosphere in a furnace at a temperature of 800° C for 2 hours. The cupric oxide (CuO) was milled by vibration and screened to obtain a fraction of −100 +250 mesh. Onto said area 70 of the electrode having the coated layer of nickel aluminide, the finely divided cupric oxide (CuO) was applied by a plasma arc coating technique to form a coating technique to form a coating of 0.2 to 0.3 (mm) in thickness. The electrode so coated was then exposed to a hot air atmosphere in a furnace at an appropriate temperature and for an appropriate duration, preferably at 400° C for 2 hours, to fully oxidize the surface of the coating.

The distributor, in accordance with this example, was included in a conentional vehicle and was tested for the noise-field intensity level in which the observed frequency of noise was within the range of from 50 to 300 (MHz). The observed level was about 20 to 25 dB below the permitted value. Further, the peak of the capacity discharge current of the distributor was revealed to be as low as 1.0 to 1.2 amp.

EXAMPLE 9

An electrode 11 made of brass (as shown in FIGS. 3-*a*, 3-*b* and 3-*c*) was washed with triclene, the area of the electrode (the hatched area 60 as shown in FIG. 6) to which a layer of electrically high resistive material was to be applied, was uniformly made coarse by a blasting technique. Onto said area 60, particulate nickel aluminide (METCO No. 450) essentially consisting of 95.5% by weight of Ni and 4.5% by weight of A1 was applied by a plasma arc coating technique to form a coating 0.1 to 0.5 (mm) in thickness. The electrode so coated was baked in a furnace at an appropriate temperature and for an appropriate duration, preferably at a temperature of at 600° C for 2 hours, to oxidize the layer of nickel aluminide.

The distributor, in accordance with this example, was included in a conventional vehicle and was tested for the noise-field intensity level in which the observed frequency of noise was within the range of from 50 to 300 (MHZ). The observed level was 15 to 20 dB below the permitted value. Further, the peak of the capacity discharge current of the distributor was revealed to be as low as 1.65 amp.

EXAMPLE 10

An electrode 11 made of steel (as shown in FIGS. 3-*a*, 3-*b* and 3-*c*) was washed with triclene, and the area of the electrode (the hatched area 90 as shown in FIG. 7) to which a layer of electrically high resistive material was to be applied, was uniformly made coarse by a blasting technique. Onto said area 70 particulate nickel aluminide essentially consisting of 95.5% by weight of Ni and 4.5% by weight of A1 was applied by a plasma arc coating technique to form a coating of 0.05 to 0.10 (mm) in thickness. Finally divided electrolytic copper of a size of −150 +350 mesh having an apparent density of 1.8 to 2.0 was oxidized to cupric oxide by exposure to a hot air atmosphere in a furnace at an appropriate temperature and for an appropriate duration, preferably at 800° C for 2 hours. The cupric oxide was milled by vibration and screened to obtain a fraction of −100 +250 mesh. Onto said area 70 of the electrode having the layer of nickel aluminide coated thereon, the cupric oxide of a size of −100 +250 mesh was applied by a plasma arc coating technique with a thickness of 0.25 to 0.55 (mm).

The distributor, in accordance with this example, was included in a conventional vehicle and was tested for the noise-field intensity level and the peak of the capacity discharge current. The observed results were similar to or better than those obtained in Example 6 in which the same electrically high resistive layer 30 as in this example was applied to a brass electrode 11. The product of this example exhibited a better adhesion of the resistive layer to the electrode, than that of Example 6.

EXAMPLE 11

An electrode 11 made of steel (as shown in FIGS. 3-*a*, 3-*b* and 3-*c*) was washed with triclene, and the area of the electrode (the hatched area 70 as shown in FIG. 7) to which a layer of electrically high resistive material was to be applied, was uniformly made coarse by a blasting technique. Onto the area 70, particulate nickel aluminide essentially consisting of 95.5% by weight of Ni and 4.5% by weight of A1 was applied by a plasma arc coating technique to form a coating of 0.5 to 0.10 mm in thickness. Onto said area 70 of the electrode having the layer of nickel aluminide coated thereon, finely divided nickel oxide was applied by a plasma arc coating technique with a thickness of 0.15 to 0.25 mm.

The distributor, in accordance with this example, was included in a conventional vehicle and was tested for the noise-field intensity level and the peak of the capacity discharge current. The observed results were approximately the same as those obtained in Example 6.

EXAMPLE 12

An electrode 11 made of steel (as shown in FIGS. 3-*a*, 3-*b* and 3-*c*) was washed with triclene, and the area of the electrode (the hatched area 70 as shown in FIG. 7) to which a layer of electrically high resistive material was to be applied, was uniformly made coarse by a blasting technique. Onto said area 70 particulate nickel aluminide essentially consisting of 95.5% by weight of Ni and 4.5% by weight of A1 was applied by a plasma arc coating technique to form a coating of 0.05 to 0.10 (mm) in thickness. Finely divided electrolytic copper of a size of −150 mesh was oxidized to cupric oxide by exposure to a hot air atmosphere in a furnace at an appropriate temperature and for an appropriate duration, preferably at 800° C for 2 hours. The cupric oxide was milled and screened to obtain a fraction of −100 +250 mesh. Onto said area 70 of the electrode having the layer of nickel aluminide coated thereon, the cupric oxide was applied by a plasma arc coating technique with a thickness of 0.4 to 0.6 (mm).

The distributor, in accordance with this example, was included in a conventional vehicle and was tested for the noise-field intensity level and the peak of the capacity discharge current. The observed results were similar to or betten than those obtained in Example 10 in which the thickness of the electrically high resistive layer 30 was somewhat different from that in this example. No undesirable exfoliation of the resistive layer 30 was observed even after repeated use of the product.

Influences, on the performance of the product, of the degree of oxidation and the thickness of the resistive layer and of the gap distance of the spark discharging gap g, were studied.

Figure 8:
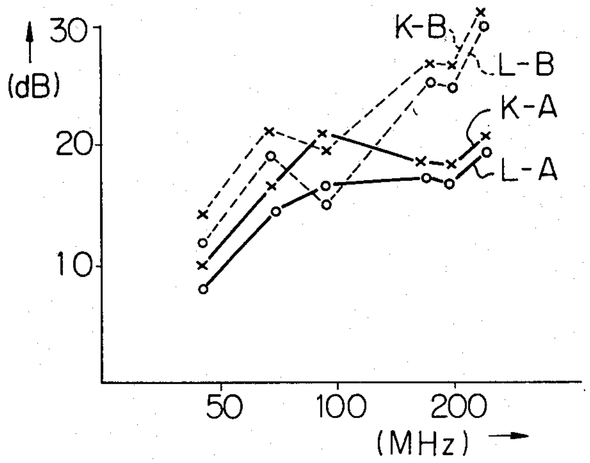
FIG. 8 is a graph showing changes of the noise-field intensity level of horizontal polarized waves with respect to an observed frequency (in MHz) by using electrodes according to example 12.

FIG. 8 illustrates the effects of the degree of oxidation of the resistive layer on the noise-field intensity level of the product, in which brass electrodes respectively plasma arc coated with two kinds of cupric oxide prepared by the oxidation of finely divided copper at the respective temperatures of 600° C for 2 hours, symbolized by "K", and 800° C for 2 hours, symbolized by "L", are compared. In FIG. 8, the abscissa indicates the frequency at which the noise-field intensity level is measured and the other coordinate indicates the noise-field intensity level of horizontal polarized waves in dB in which 0 (dB) corresponds to 1 (μv/m). The performances K—A and L—A were obtained by using one vehicle A and the performances K—B and L—B were obtained by using another behicle B. As seen from FIG. 8, better results are obtainable when oxidation is 800° C.

Figure 9:
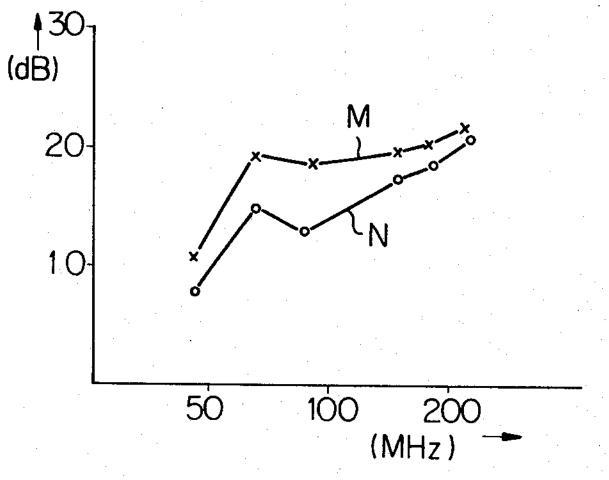
FIG. 9 is a graph showing changes of the noise field intensity level of horizontal polarized waves with respect to an observed frequency (in MHz) by using electrodes according to example 9.

FIG. 9 illustrates the effects of the thickness of the resistive layer on the noise-field intensity level of the product, in which brass electrodes plasma arc coated with cupric oxoide prepared by the oxidation of finely divided copper at 800° C for 2 hours with respective thicknesses of 0.15 to 0.25 (mm) and 0.4 to 0.5 (mm), are compared. In FIG. 9, the abscissa indicates the frequency at which the noise-field intensity level is measured and the other coordinate indicates the noise-field intensity level of horizontal polarized waves in dB in which 0 (dB) corresponds to 1 (μv/m). The performance M was obtained by using a resistive layer the thickness of which was 0.15 to 0.25 (mm) and the performance N was obtained by using a resistive layer the thickness of which was 0.4 to 0.5 (mm). As seen from FIG. 9, better results are obtainable when the thickness is 0.4 to 0.5 mm. With thickness of 0.3 (mm) or more, little or no difference was observed in the noise-field intensity level of the products at a given frequency. Moreover, excessive thickness involves a longer period of time for coating and includes the serious problem of exfoliation or peeling off of the coating. For most cases, a thickness of 0.3 to 0.5 (mm) is preferable.

Figure 10:
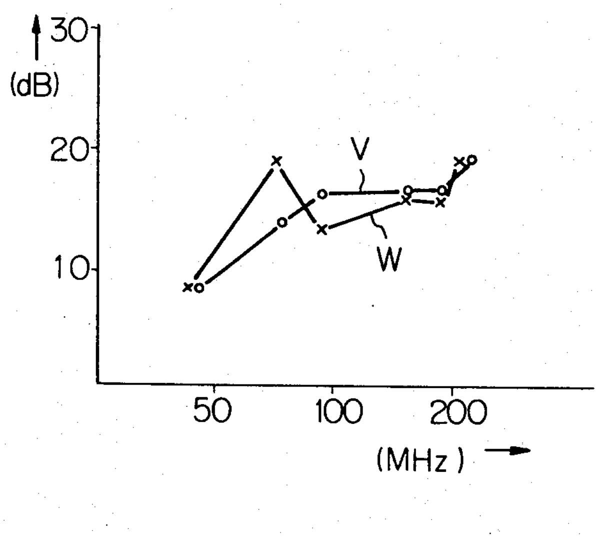
FIG. 10 is a graph showing changes of the noise-field intensity level of horizontal polarized waves with respect to an observed frequency (in MHz) by using electrodes according to example 10.

FIG. 10 illustrates the effects of a base material of the electrode on the noise-field intensity level of the product, in which brass and steel based electrodes having a resistive layer of cupric oxide plasma arc coated thereon are compared. In FIG. 9, the abscissa indicates the frequency at which the noise-field intensity level is measured and the other coordinate indicates the noise-field intensity level of horizontal polarized waves in dB in which 0 (dB) corresponds to 1 μv/m). The performance V and W were respectively obtained by using a brass based electrode and a steel based electrode. FIG. 10 indicates that there is almost no difference in the noise-field intensity level between the brass and steel based electrodes.

While there is a slight difference in the noise-field intensity level between the products having a resistive layer coated on the respective areas as shown in FIGS. 6 and 7, for mass-production, coating the electrode with a resistive layer on the area as shown in FIG. 7, is preferable.

The capacity discharge current of the product was measured with varied gap distances of the spark discharging gag g. The tested electrode was prepared by coating a brass electrode with nickel aluminide, on the area shown in FIG. 7, to a thickness of 0.05 to 0.10 (mm) and applying thereon particulate CuO (obtained by the oxidation of particulate copper at a temperature of 800° C for 2 hours) to form a top coating of 0.30 to 0.50 (mm). The test for measuring the capacity discharge current was made by using one such electrode having a gap distance g of 0.35 to 0.40 (mm) and another such electrode having a gap distance g of 0.7 to 0.8 (mm). The result of the test was that the observed peak value of the capacity discharge current when using said electrodes having a gap distance g of 0.35 to 0.40 (mm), is lower than that of said electrodes having a gap distance g of 0.7 to 0.8 (mm) by ¼ to 1/4.5 times.

EXAMPLE 13

An electrode 11 made of steel (as shown in FIGS. 3-*a*, 3-*b* and 3-*c*) was washed with triclene, and the area of the electrode (the hatched area 70 as shown in FIG. 7) to which a layer of electrically high resistive material was to be applied, was uniformly made coarse by a blasting technique. Onto said area 70 particulate nickel aluminide essentially consisting of 95.5% by weight of Ni and 4.5% by weight of Al was applied by a plasma arc coating technique to form a coating of 0.05 to 0.10 (mm) in thickness. Finely divided electrolytic copper of a size of −150 mesh was oxidized to cupric oxide by exposure to a hot air atmosphere in a furnace at a temperature of 800° C for 2 hours. The cupric oxide was milled and screened to obtain a fraction of −100 +250 mesh. Onto said area 70 of the electrode having the layer of nickel aluminide coated thereon, the cupric oxide was applied by a plasma arc coating technique with a thickness of 0.4 to 0.6 (mm).

The surface layer so formed proved to contain a substantial proportion of $Cu_2O$. The electrode was then baked in an air furnace at a temperature of 400° C for 5 hours to convert the $Cu_2O$ to CuO whereby an electrically high resistive material layer 30 substantially free of $Cu_2O$ was obtained.

The distributor, in accordance with this example, was included in a conventional vehicle and was tested for the peak of the capacity discharge current and the noise-field intensity level in which the observed frequency of noise was within the range of from 50 to 300 (MHz). The observed level was about 20 (dB) below the permitted value. Further, the peak of the capacity discharge current of the distributor was revealed to be as low as 1.6 amp. These results are similar to those obtained in Example 12. However, the performance of the distributor of this example was more stable than that of the distributor obtained in Example 12.

EXAMPLE 14

An electrode 11 made of brass (as shown in FIGS. 3-*a*, 3-*b* and 3-*c*) was washed with Triclene, and the area of the electrode (the hatched area 70 as shown in FIG. 7) to which a layer of electrically high resistive material was to be applied, was uniformly made coarse by a blasting technique. Onto said area 70 particulate nickel aluminide essentially consisting of 95.5% by weight of Ni and 4.5% by weight of Al was applied by a plasma arc coating technique to form a coating of 0.05 to 0.10 (mm) in thickness. Finely divided cupric oxide of a size of −150 +250 mesh was applied onto said area 70 of the electrode having the layer of nickel aluminide coated thereon, with a thickness of 0.4 to 0.6 (mm), by a thermo-spraying process using a oxyacetylene flame.

The distributor, in accordance with this example, was included in a conventional vehicle and was tested for the peak of the capacity discharge current and the noise-field intensity level in which the observed frequency of noise was within the range of from 50 to 300 MHz). The observed level was about 22 to 25 dB below the permitted value, and the peak of the capacity discharge current of the distributor was revealed to be as low as 1.0 to 1.2 amp. When compared with a distributor wherein the electrode has the electrically high resistive material layer applied thereto by a plasma arc coating process, a distributor wherein the electrode has the electrically high resistive material layer applied thereto by a thermo-spraying process, proved to be far more stable in performance. It is believed that this is because of the difference in proportions of $Cu_2O$ contained in the surface layers.

We have found that a surface layer, formed from particulate CuO by using a plasma arc coating process, comprises not only CuO but also $Cu_2O$ and Cu. Even under optimum conditions, the formed electrically high resistive layer contains at least 20% by weight of $Cu_2O$. The formation of such $Cu_2O$ is undesirable from the view point of a stable performace. The processes as described in Examples 13 and 14 are quite effective for reducing the formation of $Cu_2O$.

With respect to the composition of the surface layer formed from particulate CuO by using a plasma coating process, further studies using X-ray diffraction analysis revealed that while the top layer essentially consists of CuO, the under-lying layer located 100 microns or more from the surface contains $Cu_2O$ in considerable amounts, for example, 20 to 40% by weight or more. It is believed that when CuO is subjected to the action of a plasma arc it would be at least partially be decomposed to $Cu_2O$. Most of the $Cu_2O$ would be oxidized by oxygen in the atmosphere to CuO before, during or after depositing on the electrode. However, when the process is continuously carried out the $Cu_2O$ deposited on the electrode would be covered by freshly sprayed $Cu_2O$ before the former has been oxidized by the air to CuO. Thus, it is considered that if the process is carried out intermittently so that the $Cu_2O$ deposited on the electrode by one shot coating may be sufficiently oxidized to CuO before the next shot coating, an electrically high resistive layer primarily composed of CuO would be obtained. The following example was carried out on the basis of the above considerations.

EXAMPLE 15

An electrode 11 made of steel (as shown in FIGS. 3-*a*, 3-*b* and 3-*c*) was washed with Triclene, and the area of the electrode (the hatched area 70 as shown in FIG. 7) to which a layer of electrically high resistive material was to be applied, was uniformly made coarse by a blasting technique. Onto said area 70 particulate nickel aluminide essentially consisting of 95.5% by weight of Ni and 4.5% by weight of A1 was applied by a plasma arc coating technique to form a coating of 0.05 to 0.10 (mm) in thickness. Finely divided electrolytic copper of a size of −150 mesh was oxidized to cupric oxide by exposure to a hot atmosphere in a furnace at an appropriate temperature and for an appropriate duration, preferably at 800° C for 2 hours. Onto said area 70 of the electrode having the layer of nickel aluminide coated thereon, the cupric oxide was applied by a plasma arc coating technique with a thickness of about 50 microns. The spraying operation was discontinued for about 20 seconds to permit the oxidation of the coated layer. The cycle consisting of the plasma arc coating of a 50 $\mu$ layer and the subsequent oxidation was repeated 10 times.

The distributor, in accordance with this example, was included in a conventional vehicle and was tested for the noise-field intensity level and the peak of the capacity discharge current. The observed results were similar to or better than those obtained in Example 13. However, the performance of the distributor of this example was far more stable than that of the distributor obtained in Example 13.

Thus, in accordance with a still further aspect of the invention, there is provided a method for surface treatment of at least one electrode of both the distributor rotor and the stationary terminals in a distributor of an internal combusiton engine for noise suppression, wherein finely divided cupric oxide is applied onto said surface of the electrode by a plasma arc coating process until a surface layer having a thickness of 50 to 100 microns is formed, followed by subjecting the layer so-formed to oxidizing conditions, and such a cycle consisting of the plasma arc coating and the subsequent oxidation is repeated until the desired surface layer having a total thickness of 0.1 to 0.6 mm is formed.

FIG. 11 diagrammatically illustrates an apparatus for carrying out the method of Example 15. The illustrated apparatus comprises a disc 110 made of a refractory material and having a diameter of about 200 mm. The disc carries a plurality of rotors to be surface treated in accordance with methods of the invention, mounted around its periphery. A melt-spraying gun 111 is provided in a position suitable for melt-spraying CuO against the respective rotors successively. The disc 110 is driven to rotate around its central axis O at a rate of 4 to 6 rpm. Upon operation, each rotor which has received one shot, travels one rotation while being in contact with air which ensures the complete oxidation of the freshly deposited layer, and then receives the next shot. The amount of CuO (and/or $Cu_2O$) deposited on each rotor by one shot should be adjusted so that the deposited layer may be about 50 to 100 microns in thickness.

FIG. 12 is a modification of the apparatus shown in FIG. 11, wherein a burner 120 and an air ejecter are provided so that each rotor which has received one shot may be heated by the burner at a temperature of 250° to 400° C, and supplied with air.

The electrically high resistive material layer 30 formed by a method in accordance with the invention, has a plurality of micro-voids therein and the grains constituting the layer are considerably oxidized at least on their surfaces. Consequently, such a layer has an increased electrical resistance when compared with a solid layer consisting of essentially the same material. In the case wherein particulate metal whose oxidized coating has an electrically high resistance is melt-sprayed onto the electrode to form a coating thereon and the coating is then oxidized, the oxidation proceeds not only on the exposed surface of the melt-sprayed layer of the particulate metal but also inside the layer due to the presence of microvoids in the layer and, therefore, a thick and stable resistive layer can be formed. Whereas, if a solid metal layer having no micro-voids therein is oxidized, the resultant resistive layer is thin, and since the adhesion thereof to the base material is usually insufficient a special post-treatment is required to make the product durable. We have found that an extremely stable and uniform resistive layer which affords the optimum results can be formed by melt-spraying pre-oxidized particulate material onto the electrode. While the examples are mainly directed to a plasma arc coating or spraying technique, other techniques such as a flame coating or spraying technique may also be utilized to form the resistive layer, depending on the nature of the material to be applied.

In accordance with the invention, the noise-field intensity of the noise radiated from the distributor can effectively be suppressed well below the permitted level (ECE Reg 10).

For the purpose of the invention a plasma arc coating, thermo-spraying or detonation process has proved to be much more superior to other techniques, such as plating, diffusion coating and cladding processes, in that the selected technique enables a reasonably thick coating suitable for the purpose to be formed in a simple manner and that the thickness of the surface layer may readily be adjusted in the practice of the methods of the invention by suitably selecting particular process conditions. In addition, the following advantages can also be attained:

a. The required treatment is very simple; that is the surface treatment needs to be carried out on either the distributor rotor or the stationary terminals only.
b. The method is suitable for mass-production.
c. The involved cost is 1/5 to 1/10 of that required for the prior art apparatus for suppressing noise.
d. The adjustment of the value of resistance of the resistive layer is easy and arbitrary.
e. The method is generally applicable to other apparatuses and instruments in which noise accompanied by a discharge phenomena, must be suppressed.

What we claim is:

1. A method for surface treatment of at least one electrode of both the distributor rotor and the stationary terminals in a distributor of an internal combustion engine for noise suppression, wherein finely divided material having a high electrical resistance is applied onto a surface of the electrode to be treated by a plasma arc coating process or a thermo-spraying process or a detonation process to form a surface layer.

2. Method as set forth in claim 1, wherein said finely divided material has an electrical resistance of $10^{-3}$ to $10^{9}\Omega\cdot cm$ and is applied onto the surface of the electrode with a thickness of 0.1 to 0.6 mm.

3. Method as set forth in claim 2, wherein said material is selected from CuO, NiO, $Cr_2O_3$, Si and $VO_2$.

4. Method as set forth in claim 1, wherein, prior to said application of the finely divided material onto said surface of the electrode, finely divided nickel aluminide is applied onto said surface of the electrode, which is made of steel or brass, by a plasma arc coating process or a thermo-spraying process to form a layer of nickel aluminide on said surface of the electrode, and then finely divided CuO or NiO is applied onto said layer of nickel aluminide.

5. Method as set forth in claim 1, wherein finely divided CuO is applied onto said surface of the electrode, by a thermo-spraying process to form a surface layer.

6. Method as set forth in cliam 1, wherein finely divided CuO is applied onto said surface of the electrode by a plasma arc coating process to form a surface layer of 0.1 to 0.6 mm in thickness and the so-formed layer is subjected to oxidizing conditions.

7. Method as set forth in claim 6, wherein oxidation of the surface layer material is carried out by contacting it with air at a temperature of 300° to 800° C.

8. Method as set forth in claim 1, wherein finely divided cupric oxide is applied onto said surface of the electrode by a plasma arc coating process until a surface layer of a thickness of 50 to 100 microns is formed, followed by subjecting the layer so formed to oxidizing conditions, and the cycle consisting of the plasma arc coating and subjecting to oxidizing conditions is repeated until the desired surface layer, having a total thickness of 0.1 to 0.6 mm, is formed.

9. Method for surface treatment of at least one electrode of both the distributor rotor and the stationary terminals in a distributor of an internal combustion engine for noise suppression, wherein a finely divided metallic material, at least the surface of which is capable of possessing a high electrical resistance when it is oxidized, is applied onto the surface of said electrode by a plasma arc coating process or a thermo-spraying process or a detonation process to form a surface layer on said electrode, and then the surface layer so formed is oxidized.

10. Method as set forth in claim 9, wherein said finely divided material is selected from copper, Fe—36% Ni alloy, aluminum, nickel and silicon.

11. Method as set forth in claim 9, wherein, prior to said application of the finely divided material onto said surface of the electrode, finely divided nickel aluminide is applied onto said surface of the electrode, which is made of steel or brass, by a plasma arc coating process or a thermo-spraying to form a layer of nickel aluminide on said surface of the electrode, and then finely divided copper or nickel is applied onto said layer of nickel aluminide.

12. Method as set forth in claim 9, wherein said oxidation is carried out by baking the metallic layer in a hot air furnace at a temperature of 300° to 900° C for 1 to 10 hours.

13. Method for surface treatment of at least one electrode of both the distributor rotor and the stationary terminals in a distributor of an internal combustion engine for noise suppression, wherein a finely divided material, at least the surface of which is capable of possessing a high electrical resistance when it is oxidized, is oxidized and then applied onto the surface of said electrode by a plasma arc coating process or a thermo-spraying process or a detonation process to form a surface layer on said electrode.

14. Method as set forth in claim 13, wherein said finely divided material is selected from copper, Fe—36% Ni alloy, aluminum, nickel and silicon.

15. Method as set forth in claim 13, wherein, prior to said application of the oxidized finely divided material onto said surface of the electrode, finely divided nickel aluminide is applied onto said surface of the electrode, which is made of steel or brass, by a plasma arc coating process of a thermo-spraying process to form a layer of nickel aluminide on said surface of the electrode and then oxidized finely divided CuO or NiO is applied onto said layer of nickel aluminide.

16. Method as set forth in claim 13, wherein said oxidation is carried out by baking the material in an air furnace at a temperature of 300 to 900° C for 1 to 10 hours.

* * * * *